June 26, 1962 L. PIERCEALL 3,040,484
ELECTRICAL BRUSH CONTOURING AND SEATING TOOL
Filed March 17, 1959
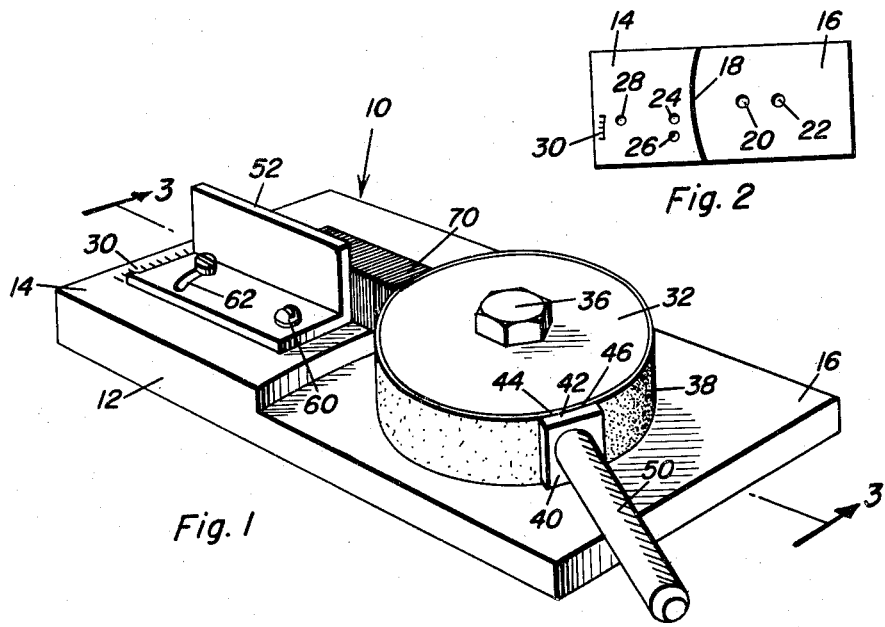
Fig. 2
Fig. 1
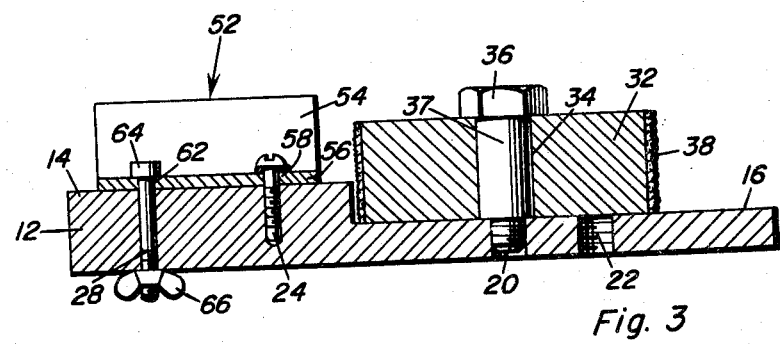
Fig. 3
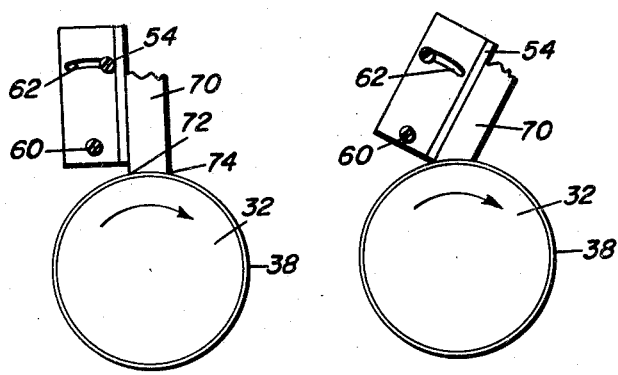
Fig. 4  Fig. 5
Lewis Pierceall
INVENTOR.
BY Clarence A. O'Brien
and Harvey B. Jacobson
Attorneys { # United States Patent Office 3,040,484
Patented June 26, 1962

3,040,484
ELECTRICAL BRUSH CONTOURING AND SEATING TOOL
Lewis Pierceall, London Bridge, Va.
(Route 3, Box 520, Lynnhaven, Va.)
Filed Mar. 17, 1959, Ser. No. 799,928
17 Claims. (Cl. 51—187)

This invention relates generally to a tool contouring device, and more particularly to apparatus specifically designed to enable an operator to correctly contour electrical carbon brushes.

Brush carriers and rigging assemblies in motors and generators are often found to be at different angles, longitudinally, with respect to the commutating surface of the brush. Therefore, pre-contoured brushes frequently will not be correctly accommodated when installed upon replacement. Disadvantages of present methods of contouring brushes while in the motor or generator are apparent. For example, when sandpaper is utilized around an armature commutator or slip ring, carbon dust is generally released from the brushes and is deposited in the commutator segments adjacent the brush surfaces and acts to score and damage the smooth film required on the commutator segments. Further, the limited access to the brush carriers often causes the operator to spring the assemblies out of proper alignment with resulting commutation changes which ultimately cause sparking, etc. Still further, it has been found that when a sanding stone is utilized to seat brushes, grit from the stone becomes lodged in the commutator segments and dust from the brushes often shorts out armature windings, resulting in premature failure of the equipment. It has also been found that the utilization of a sanding stone removes the lubricating film from the commutator segments or slip rings, causing ultimate damage.

In view of the foregoing deficiencies of methods heretofore used, the inventor herein contemplates the contouring of the brushes at locations remote from the motor or generator. Accordingly, all carbon dust remains outside the unit with no resulting scoring or shorting. Also, no grit is deposited in the unit to prevent it from working properly and, still further, the lubricating film is left intact. Only the brush covers need be removed to utilize the contouring tool with the brushes. Utilizing this invention eliminates the necessity of working with tools or knives adjacent the commutator and slip rings so the possibility of marring the surfaces thereof is eliminated.

The principal object of this invention is to provide a novel tool to enable carbon brushes to be properly contoured.

It is a further object of this invention to provide a novel tool which is relatively simple to operate.

It is a still further object of this invention to provide a tool for efficiently contouring carbon brushes which enables the performance of a method which eliminates heretofore known undesirable results which adversely affect the motors or generators concerned.

A still further object of this invention is to provide a novel tool for conturing brushes which is simple in construction, reliable, and relatively inexpensive to manufacture.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view of the invention illustrating a brush being contoured;

FIGURE 2 is an elevational view of the base of the invention;

FIGURE 3 is a sectional view taken substantially along the plane 3—3 of FIGURE 1;

FIGURES 4 and 5 are fragmentary elevational views illustrating the mode of operation of the invention.

With continued reference to the drawings and with initial reference to FIGURE 1, the numeral 10 generally represents the tool including a rectangular base 12 having an upper portion 14 and a lower portion 16. An arcuate vertical wall 18 separates the upper and lower portions 14 and 16 and acts to direct dust laterally of the base 12 and to thereby prevent interfering accumulations, respectively. The lower portion includes threaded apertures 20 and 22 extending vertically therethrough. The apertures 20 and 22 are approximately positioned on the longitudinal axes of the base 12. A pair of threaded bores 24 and 26 are positioned on the upper portion 14 of the base 12 and vertically extend into the base. Spaced therefrom is an aperture 28 extending through the base 12 entirely. Indicia 30 is etched on the upper portion 14 of base 12.

A disk 32 has an aperture 34 therethrough and receives a bolt 36 which is accommodated in aperture 20 in the lower portion 16 of base 12. A sandpaper strip 38 is received circumferentially on the disk 32. A retainer 40 having an arcuate surface 42 overlies the ends 44 and 46 of the strip 38 to retain the sandpaper strip on the disk 32. The retainer 42 includes an aperture therein aligned with a radial cavity in the disk. A threaded reduced portion on handle 50 extends through the retainer and is threadedly engaged in the radial cavity extending into the disk 32. A shoulder formed between the handle portion proper and the reduced portion assures the retention of the retainer 42 adjacent the disk 32. It will be appreciated that the handle 50 allows a person to rotate the disk 32 about the shank portion 37 of bolt 36.

An angle iron 52 has a vertical leg 54 and a horizontal leg 56 positioned adjacent and flush with the upper portion 14 of base 12. An aperture 58 in the leg 56 is adapted to be aligned with either of the apertures 24 or 26 in the upper portion 14 of the base 12. A screw 60 pivotally secures the angle iron 52 to the upper portion 14 of the base 12. An arcuate slot 62 extends through the leg 56 of the angle iron 52 and receives therethrough a screw 64 which is accommodated in the aperture 28 in the base 12. A wing nut 66 is threadedly engaged with the screw 64 below the base 12. It will be appreciated that the angle iron 52 may be pivoted about the screw 60 and locked in any pivotal position by partly threading the wing nut 66 on the screw 64. The indicia 30 is intended to indicate the angle which the angle iron 52, constituting a brush guide, forms relative to the side surfaces of the base 12.

In the utilization of this invention, a brush 70 is removed from a motor or generator and the contacting area thereof is matched with the disk circumference. It will be appreciated that different size disks may be utilized with the present invention. In mating the contact area of the brush with the circumferential surface of the disk, the disk should substantially contact the brush area along the entire length thereof between the toe and the heel 72 and 74, respectively. We have now determined the correct size of the disk to be utilized, and accordingly the disk is mounted on the base 12 as is indicated in FIGURES 1 and 2 and, of course, dependent upon the size of the disk, the aperture 20 or 22 is utilized. We further use the removed brush to determine the correct angular relationship of the index guide or angle iron 52. As is indicated in FIGURES 4 and 5, the brush 70 is fitted against the disk 32 and an abrasive strip 38 by pivoting the angle iron 52 about the screw 60. When the angle iron 52 is properly aligned so that the removed brush has a contact area which is fully in touch with the abrasive strip 38, the wing nut 66 is tightened so as to lock the angle iron 52 in position. Now, the removed brush may be discarded and a new brush may be utilized in place of the discarded brush in the same position. The new brush is held firmly adjacent the vertical leg 54 as is indicated in FIGURES 4 and 5 and the disk is slowly turned so that the abrasive strip 38 contours the new brush until the mating surface of the brush 70 fully contacts the disk from toe to heel. The new brushes then may be properly installed in the unit.

It is to be appreciated that the particular material utilized in the construction of this invention are not significant thereto and any material readily adapted thereto falls within the teachings contemplated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A brush contouring tool comprising a base, a disk of a selected dimension rotatably mounted on said base for movement about an axis mounted in an adjustably fixed position on the base, a guide supported on said base in an adjustably fixed position spaced from said disk and on a plane parallel to and fixedly offset with respect to said disk, an abrasive surface on said disk having a contouring curvature for contouring a brush seated by engagement with the guide and disk.

2. A brush contouring tool comprising a base, a disk of a selected dimension rotatably mounted on said base for movement about an axis mounted in an adjustably fixed position on the base, a guide supported on said base in an adjustably fixed position spaced from said disk and on a plane parallel to and fixedly offset with respect to said disk, an abrasive surface on the peripheral portion of said disk, said abrasive surface constituting a removable contouring strip having a contouring curvature for contouring a brush seated by engagement with the guide and disk, a retainer carried by said disk retaining said strip on said disk.

3. A brush contouring tool comprising a base, a disk of a selected dimension rotatably mounted on said base for movement about an axis mounted in an adjustably fixed position on the base, a guide supported on said base in an adjustably fixed position spaced from said disk, said base including an upper portion and a lower portion, an arcuate vertical wall extending between said upper and lower portions for laterally directing flow of dust, said disk being mounted on said lower base portion in vertical offset relation to said guide mounted on said upper base portion, an abrasive surface on said disk having a contouring curvature for contouring a brush seated by engagement with the guide and disk.

4. A brush contouring tool comprising a base, a disk of a selected dimension rotatably mounted on said base for movement about an axis mounted in an adjustably fixed position on the base, a guide supported on said base in an adjustably fixed position spaced from said disk, said base including an upper portion and a lower portion, an arcuate vertical wall extending between said upper and lower portions for laterally directing flow of dust, said disk being mounted on said lower base portion in vertical offset relation to said guide mounted on said upper base portion, an abrasive surface on the peripheral portion of said disk, said abrasive surface constituting a removable contouring strip having a contouring curvature for contouring a brush seated by engagement with the guide and disk, a retainer carried by said disk retaining said strip on said disk.

5. A brush contouring tool comprising a base, a disk of a selected dimension rotatably mounted on said base for movement about an axis mounted in an adjustably fixed position on the base, a guide supported on said base in an adjustably fixed position spaced from said disk and on a plane parallel to and fixedly offset with respect to said disk, said guide constituting an angle iron including perpendicular legs, a first leg pivotally supported on said base flush therewith and a contouring abrasive surface on said disk vertically offset from said first leg for contouring a brush seated by engagement with a second leg of said guide and the disk.

6. A brush contouring tool comprising a base, a disk of a selected dimension rotatably mounted on said base for movement about an axis mounted in an adjustably fixed position on the base, a guide supported on said base in an adjustably fixed position spaced from said disk, said base including an upper portion and a lower portion, an arcuate vertical wall extending between said upper and lower portions for laterally directing flow of dust, said guide constituting an angle iron including perpendicular legs, a first leg pivotally supported on said base flush therewith and a contouring abrasive surface on said disk vertically offset from said first leg for contouring a brush seated by engagement with a second leg of said guide and the disk.

7. A brush contouring tool comprising a base, a disk of a selected dimension rotatably mounted on said base for movement about an axis mounted in an adjustably fixed position on the base, a guide supported on said base in an adjustably fixed position spaced from said disk, said base including an upper portion and a lower portion, an arcuate vertical wall extending between said upper and lower portions for laterally directing flow of dust, said disk being mounted on said lower base portion, said guide mounted on said upper base portion, an abrasive surface on the peripheral portion of said disk, said abrasive surface constituting a removable contouring strip, a retainer carried by said disk retaining said strip on said disk, said guide constituting an angle iron including perpendicular legs, a first leg pivotally supported on said base flush therewith and a second leg for engagement by a brush for seating thereof against said contouring strip on the disk.

8. A brush contouring tool comprising, bi-level base means, contouring disk means supported by the base means on a first plane surface for angular displacement about an adjustably fixed rotational axis, guide means supported by the base means on a second plane surface in parallel spaced relation to said first plane surface for angular adjustment about a pivotal axis in laterally adjustable and fixedly spaced relation to said rotational axis, dust directing means mounted on the base means between the guide means and disk means for directing flow of dust laterally of the disk means and guide means and abrasive surface means replaceably mounted on the disk means for contouring a brush seated on said second plane surface by engagement therewith and with said guide means, in response to angular displacement of the disk means.

9. The combination of claim 8 wherein said dust directing means includes a curved vertical wall disposed between said disk means and guide means and more closely spaced to the disk means adjacent to the seated location of the brush for receiving dust resulting from contouring to prevent interfering accumulation thereof.

10. The combination of claim 9, wherein said guide means includes an angularly adjustable guide surface disposed in a plane perpendicular to said second plane surface to predetermine the seating of a brush between said second plane surface, the guide surface and a contouring surface portion of said abrasive surface means.

11. The combination of claim 10 wherein said abrasive surface means comprises a removable abrasive strip and means operatively connected to said disk means for retaining the abrasive strip thereon and imparting angular displacement thereto.

12. The combination of claim 8, wherein said guide means includes an angularly adjustable guide surface disposed in a plane perpendicular to said second plane surface to predetermine the seating of a brush between said second plane surface, the guide surface and a contouring surface portion of said abrasive surface means.

13. The combination of claim 8 wherein said abrasive surface means comprises a removable abrasive strip and means operatively connected to said disk means for retaining the abrasive strip thereon and imparting angular displacement thereto.

14. A brush contouring tool comprising, contouring surface means dimensionally selected to present an abrasive surface portion mating with a desired contour of a brush, adjustable guide means for guiding feeding movement of the brush against the contouring surface means to form the brush contour at a desired angular position relative to a commutating surface, base means supporting said contouring surface means and guide means in fixedly spaced relation to each other on parallel spaced plane surfaces and dust directing means formed on said base means below said guide means for receiving and directing abraded matter away from said abrasive surface portion.

15. The combination of claim 14 including manual means operatively connected to the contouring surface means for imparting movement thereto.

16. The combination of claim 15 including indicia means mounted on the base means for indicating the angular adjustment of the guide means.

17. The combination of claim 14 including indicia means mounted on the base means for indicating the angular adjustment of the guide means.

References Cited in the file of this patent

UNITED STATES PATENTS

| | | |
|---|---|---|
| 1,395,880 | Ward | Nov. 1, 1921 |
| 1,614,005 | Lewis | Jan. 11, 1927 |
| 1,831,863 | Irwin | Nov. 17, 1931 |
| 1,903,101 | Faley | Mar. 28, 1933 |
| 2,125,742 | Sundhauss | Aug. 2, 1938 |
| 2,169,954 | King | Aug. 15, 1939 |
| 2,351,842 | Seibold | June 20, 1944 |

FOREIGN PATENTS

| | | |
|---|---|---|
| 628,400 | France | June 27, 1927 |